(12) United States Patent
Ma et al.

(10) Patent No.: US 9,209,523 B2
(45) Date of Patent: Dec. 8, 2015

(54) APPARATUS AND METHOD FOR MODULAR MULTI-SECTOR ACTIVE ANTENNA SYSTEM

(71) Applicant: FutureWei Technologies, Inc., Plano, TX (US)

(72) Inventors: Zhengxiang Ma, Summit, NJ (US); Leonard Piazzi, Denville, NJ (US); Alexis Pierides, Piscataway, NJ (US)

(73) Assignee: Futurewei Technologies, Inc., Plano, TX (US)

( * ) Notice: Subject to any disclaimer, the term of this patent is extended or adjusted under 35 U.S.C. 154(b) by 244 days.

(21) Appl. No.: 13/774,945

(22) Filed: Feb. 22, 2013

(65) Prior Publication Data

US 2013/0225222 A1 Aug. 29, 2013

Related U.S. Application Data

(60) Provisional application No. 61/603,086, filed on Feb. 24, 2012, provisional application No. 61/603,107, filed on Feb. 24, 2012, provisional application No. 61/603,122, filed on Feb. 24, 2012, provisional application No. 61/603,132, filed on Feb. 24, 2012.

(51) Int. Cl.
*H01Q 1/12* (2006.01)
*H01Q 19/10* (2006.01)
(Continued)

(52) U.S. Cl.
CPC ............. *H01Q 19/10* (2013.01); *H01Q 1/02* (2013.01); *H01Q 1/246* (2013.01); *H01Q 1/42* (2013.01);
(Continued)

(58) Field of Classification Search
CPC ...... H04W 84/042; H01Q 19/10; H01Q 3/26; H01Q 19/106; H01Q 1/02; H01Q 1/42; H01Q 21/205
USPC .......... 342/361, 368, 174, 372; 343/890, 891, 343/892, 893, 853; 455/517
See application file for complete search history.

(56) References Cited

U.S. PATENT DOCUMENTS 2,861,177 A 11/1958 Dishal et al.
4,949,090 A 8/1990 Tamii et al.
(Continued)

FOREIGN PATENT DOCUMENTS

CN 1553717 A 12/2004
CN 101032053 A 9/2007
(Continued)

OTHER PUBLICATIONS

Thomas, T., et al., "Experimental MIMO Comparisons of a 4-Element Uniform Linear Array to an Array of Two Cross Polarized Antennas at 3.5 GHz," IEEE 70th Vehicular Technology Conference Fall, Sep. 20-23, 2009, 5 pages.
(Continued)

*Primary Examiner* — Tho G Phan
(74) *Attorney, Agent, or Firm* — Slater & Matsil, L.L.P.

(57) ABSTRACT

Multiple radio frequency (RF) modules can be arranged in a multi-sector configuration. Each RF modules may have a wedge-like shape such that the RF modules may be adjacently affixed to one another in spherical cluster, thereby providing multi-sector coverage while maintaining a relatively compact active antenna installation. Additionally, multiple clusters of RF modules can be arranged in an array to provide beam-forming and/or other advances antenna functionality.

25 Claims, 16 Drawing Sheets

(51) Int. Cl.
  *H01Q 3/26* (2006.01)
  *H04W 84/04* (2009.01)
  *H01Q 1/02* (2006.01)
  *H01Q 1/42* (2006.01)
  *H01Q 1/24* (2006.01)
  *H01Q 21/20* (2006.01)

(52) U.S. Cl.
  CPC .............. *H01Q 3/26* (2013.01); *H01Q 19/106* (2013.01); *H04W 84/042* (2013.01); *H01Q 21/205* (2013.01)

(56) References Cited

U.S. PATENT DOCUMENTS

| | | | |
|---|---|---|---|
| 4,994,813 | A | 2/1991 | Shiramatsu et al. |
| 5,187,486 | A | 2/1993 | Kölzer |
| 5,294,934 | A | 3/1994 | Matsumoto |
| 5,477,229 | A | 12/1995 | Caille et al. |
| 5,530,449 | A | 6/1996 | Wachs et al. |
| 5,559,519 | A | 9/1996 | Fenner |
| 5,677,696 | A | 10/1997 | Silverstein et al. |
| 5,861,843 | A | 1/1999 | Sorace et al. |
| 5,929,809 | A | 7/1999 | Erlick et al. |
| 5,969,689 | A * | 10/1999 | Martek et al. ................. 343/758 |
| 6,046,697 | A | 4/2000 | Overbury et al. |
| 6,127,966 | A | 10/2000 | Erhage |
| 6,134,422 | A * | 10/2000 | Bobadilla et al. ............. 455/561 |
| 6,140,972 | A | 10/2000 | Johnston et al. |
| 6,163,296 | A | 12/2000 | Lier et al. |
| 6,188,373 | B1 * | 2/2001 | Martek ......................... 343/893 |
| 6,356,233 | B1 | 3/2002 | Miller et al. |
| 6,384,781 | B1 | 5/2002 | Kautz et al. |
| 6,507,315 | B2 | 1/2003 | Purdy et al. |
| 6,999,042 | B2 * | 2/2006 | Dearnley et al. .............. 343/890 |
| 7,136,017 | B2 | 11/2006 | Condon et al. |
| 7,199,753 | B2 | 4/2007 | Pauplis |
| 7,215,298 | B1 | 5/2007 | Fraschilla et al. |
| 7,868,843 | B2 * | 1/2011 | Borau et al. .................. 343/844 |
| 7,876,276 | B1 | 1/2011 | Zaman et al. |
| 7,916,082 | B1 | 3/2011 | Herting |
| 8,686,909 | B2 | 4/2014 | Frank et al. |
| 2002/0171583 | A1 | 11/2002 | Purdy et al. |
| 2003/0032424 | A1 | 2/2003 | Judd et al. |
| 2003/0038746 | A1 | 2/2003 | Patel et al. |
| 2003/0038747 | A1 | 2/2003 | Patel et al. |
| 2003/0117315 | A1 | 6/2003 | Graham |
| 2004/0061644 | A1 | 4/2004 | Lier et al. |
| 2006/0071859 | A1 | 4/2006 | Condon et al. |
| 2006/0192710 | A1 | 8/2006 | Schieblich |
| 2006/0284768 | A1 | 12/2006 | Pauplis |
| 2007/0007898 | A1 | 1/2007 | Bruning |
| 2007/0210959 | A1 * | 9/2007 | Herd et al. .................... 342/368 |
| 2007/0241978 | A1 * | 10/2007 | Cheng ........................... 343/754 |
| 2008/0129613 | A1 | 6/2008 | Ermutlu et al. |
| 2009/0153394 | A1 | 6/2009 | Navarro et al. |
| 2011/0032158 | A1 | 2/2011 | Rodger et al. |
| 2011/0260944 | A1 | 10/2011 | Ferris |
| 2012/0020431 | A1 | 1/2012 | Tanabe et al. |
| 2012/0028587 | A1 | 2/2012 | Ferguson et al. |
| 2012/0206291 | A1 | 8/2012 | Schuman et al. |
| 2013/0120199 | A1 | 5/2013 | Frank et al. |
| 2013/0222201 | A1 | 8/2013 | Ma et al. |
| 2013/0234883 | A1 | 9/2013 | Ma et al. |

FOREIGN PATENT DOCUMENTS

| | | |
|---|---|---|
| CN | 101904051 A | 12/2010 |
| CN | 102035061 A | 4/2011 |
| CN | 102347532 A | 2/2012 |
| EP | 2173005 A1 | 4/2010 |
| KR | 20100109761 A | 10/2011 |

OTHER PUBLICATIONS

Office Action received in Chinese Application No. 201380010437.7 dated Jun. 15, 2015, 6 pages.
Search Report received in Chinese Application No. 2013800104377 dated Jun. 6, 2015, 2 pages.

* cited by examiner

APPARATUS AND METHOD FOR MODULAR MULTI-SECTOR ACTIVE ANTENNA SYSTEM

This application claims the benefit of U.S. Provisional Application No. 61/603,086 entitled "Apparatus and Method for an Active Antenna System with RF Probes," U.S. Provisional Application No. 61/603,107 entitled "Apparatus and Method for a Modular Multi-Sector Active Antenna System for a Multi-Sector Small Cell Application," U.S. Provisional Application No. 61/603,122 entitled "Apparatus and Method for a Modular Multi-Sector Active Antenna System with a Heat Sinking Reflector," and U.S. Provisional Application No. 61/603,132 entitled "Apparatus and Method for a Modular Multi-Sector Active Antenna System," each of which were filed on Feb. 24, 2012 and are incorporated by reference herein as if reproduced in their entireties.

TECHNICAL FIELD

The present disclosure relates to antenna systems, and, in particular embodiments, to an apparatus and method for a modular multi-sector active antenna system.

BACKGROUND

Modern wireless networks use active antenna systems (AASs) to achieve increased performance on the wireless link. Active antennas are presently used in macro base stations (BSs), and it is foreseeable that active antennas will be deployed as small cell wireless transceivers in the near future. Accordingly, there is potentially significant market demand for compact, modular AAS designs that are cost effective, durable, and capable of being reliably installed and serviced in remote field locations.

SUMMARY

Technical advantages are generally achieved, by embodiments of this disclosure which describe an apparatus and method for a modular multi-sector active antenna system.

In accordance with an embodiment, a multi-sector antenna is provided. In this example, the multi-sector antenna includes a cluster of radio frequency (RF) modules configured for wireless communication. At least some RF modules in the cluster of RF modules are configured to provide wireless coverage to different sectors in a plurality of sectors in a coverage area of the multi-sector antenna.

In accordance with another embodiment, an active antenna system (AAS) for providing wireless access to a plurality of sectors is provided. In this example, the AAS includes a backplane structure and a plurality of radio frequency (RF) modules affixed to the backplane structure. At least one RF module in the plurality of RF modules is configured to provide wireless coverage to a different sector than another RF module in the plurality of RF modules.

In accordance with yet another embodiment, a method for operating an AAS is provided. In this example, the method includes communicating, by the AAS, data with wireless devices positioned within a plurality of sectors in a multi-sector coverage area of the AAS. The AAS includes a plurality of RF modules. At least one RF module in the plurality of RF modules is configured to serve a different one of the plurality of sectors than another RF module in the plurality of RF modules.

BRIEF DESCRIPTION OF THE DRAWINGS

For a more complete understanding of the present disclosure, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The making and using of the embodiments of this disclosure are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Modular AASs include multiple independent radio frequency (RF) modules that work together as an active antenna system. Conventional modular AASs typically exhibit bulky installations despite the otherwise compact nature of the individual RF modules. For instance, Alcatel-Lucene's (ALU's) lightradio cube (as depicted in FIG. 3A) typically exhibits bulky AAS installations (as depicted in FIG. 3B) due to their reliance on external heat exchangers. Furthermore, conventional RF modules are not typically designed for a multi-sector antenna. Accordingly, RF module designs capable of a compact multi-sector AAS installation are desired.

Disclosed herein are RF modules capable of being implemented in a multi-sector or arrayed configuration while maintaining a relatively compact AAS installation. In one example, the RF modules include a wedge like shape for facilitating compact multi-sector antenna installations. The RF modules are field serviceable, and capable of working together to provide active antenna functionality. Additionally, the RF modules can be arranged in multi-sector antenna clusters, which may be arrayed to provide beamforming functionality.

Figure 1:
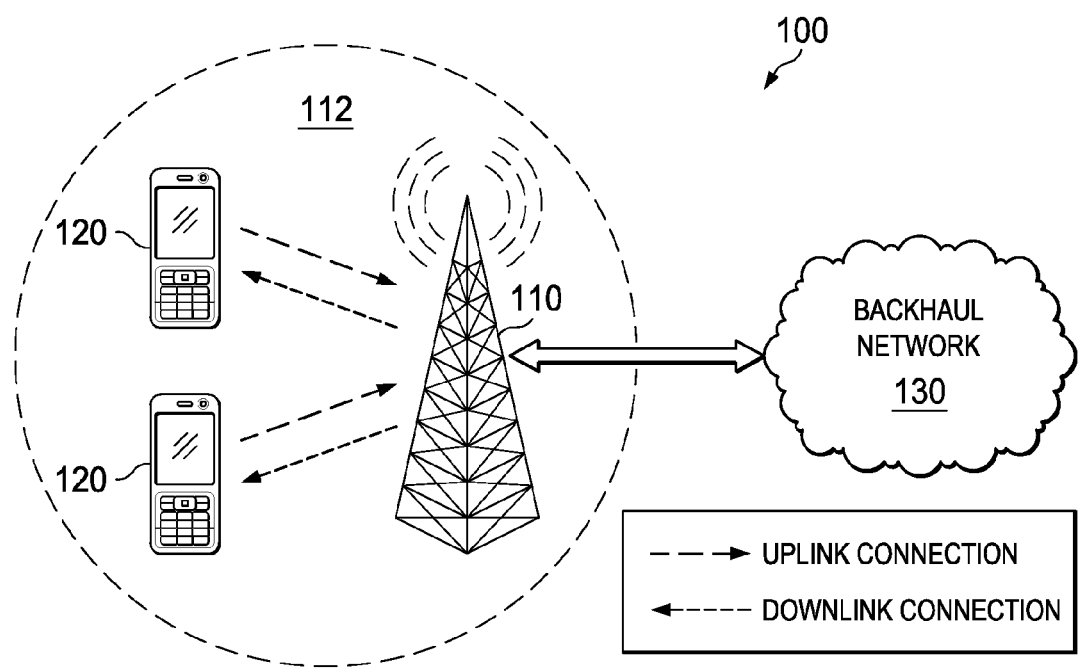
FIG. 1 illustrates a diagram of a wireless network for communicating data.

FIG. 1 illustrates a network 100 for communicating data. The network 100 comprises an access point (AP) 110 having a coverage area 112, a plurality of user equipments (UEs) 120, and a backhaul network 130. The AP 110 may include a modular AAS that is capable of providing wireless access by, inter alia, establishing uplink (dashed line) and/or downlink (dotted line) connections with the UEs 120. The AP 110 may be a macro base station, an enhanced base station (eNB), a pico base station, a micro base station, a femtocell, or any other device configured to provide wireless access to wirelessly enabled devices. The UEs 120 may comprise any component capable of establishing a wireless connection with the AP 110. The backhaul network 130 may be any component or collection of components that allow data to be exchanged between the AP 110 and a remote end (not shown). In some embodiments, the network 100 may comprise various other wireless devices, such as relays, femtocells, etc.

Figure 2:
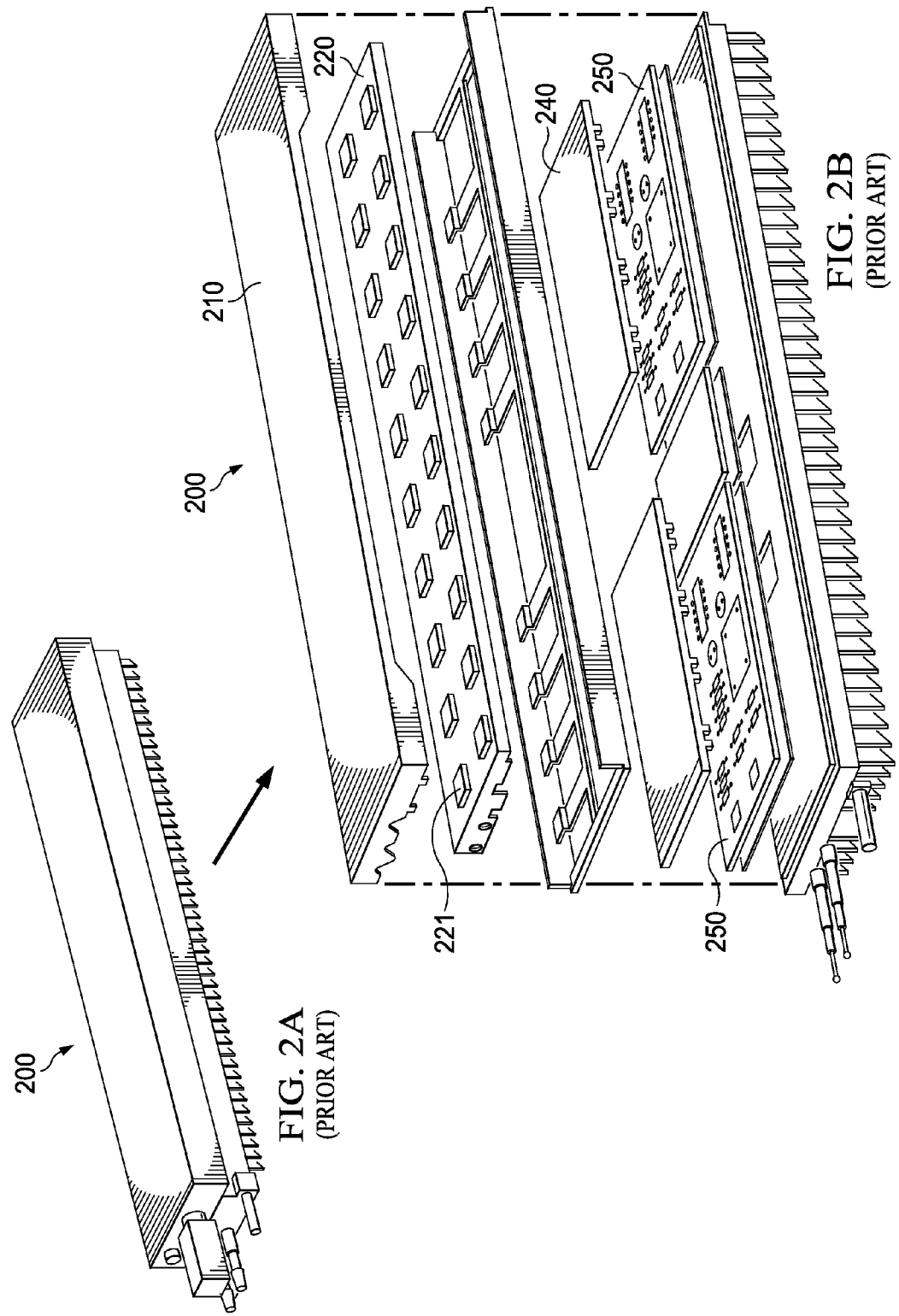
FIGS. 2A-2B illustrate diagrams of a conventional non-modular AAS.
Figure 3:
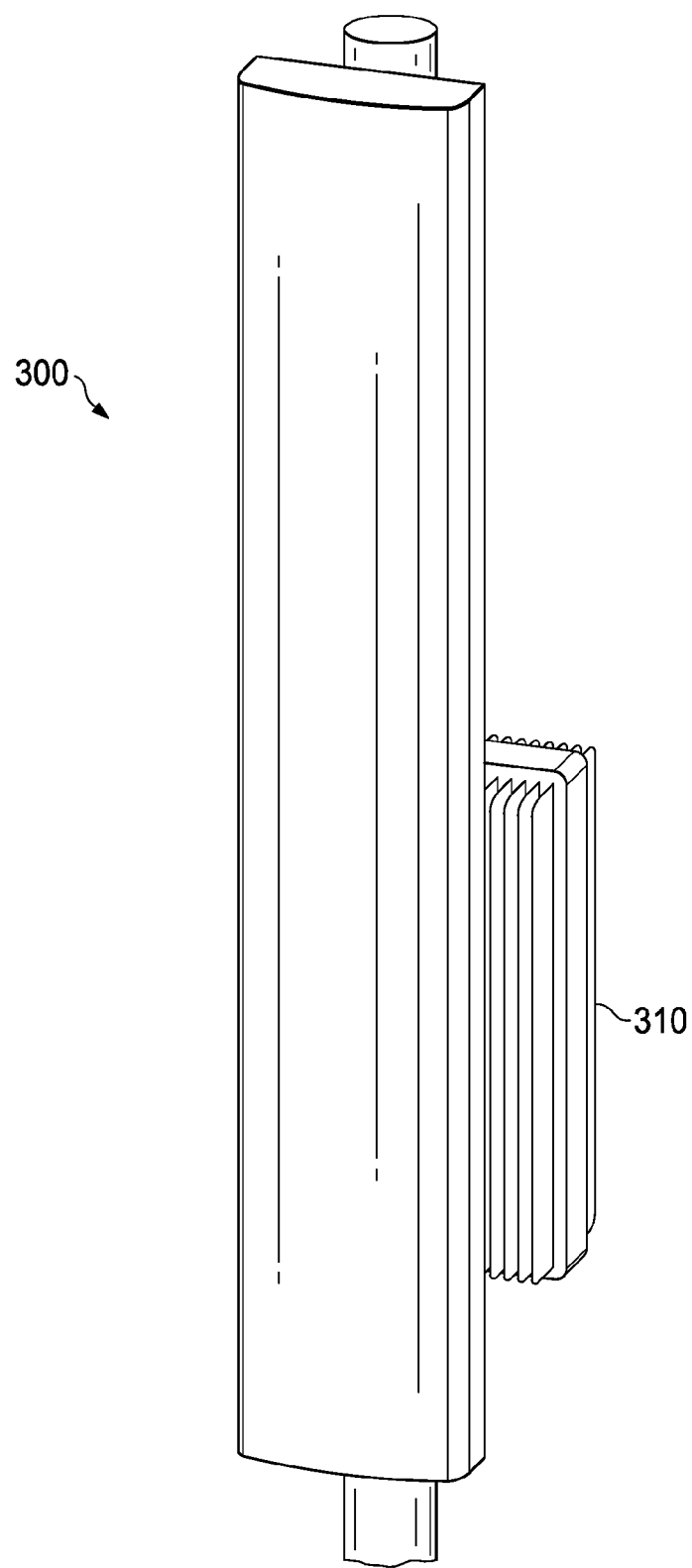
FIG. 3 illustrates a diagram of a conventional antenna with a conventional RRU attached to its back.

Active antenna elements in conventional non-modular AASs are typically incapable of cohesively interacting with external antenna elements, and are therefore generally unsuitable for implementation in a larger arrayed active antenna system. FIGS. 2A-2B illustrate a conventional non-modular AAS 200, as may be common place in present day wireless access networks. As shown, the conventional non-modular AAS 200 includes a radome 210, an antenna reflector 220, a plurality of antenna elements 221, a plurality of duplexers 240, and an active circuit board 250. While, the antenna elements 221 of the non-modular AAS 200 may be configured to interact with other antenna elements 221 in the non-modular AAS 200 to achieve active antenna functionality, the antenna elements 221 of the non-modular AAS 200 may be incapable of interacting with external components (e.g., RF modules, etc.) to form an arrayed active antenna network. FIG. 3 illustrates a conventional antenna 300 with an external remote radio unit (RRU) 310 attached to its back. The RRU 310 may include active components for transmitting and/or receiving signals over the conventional antenna 300.

Figure 4B:
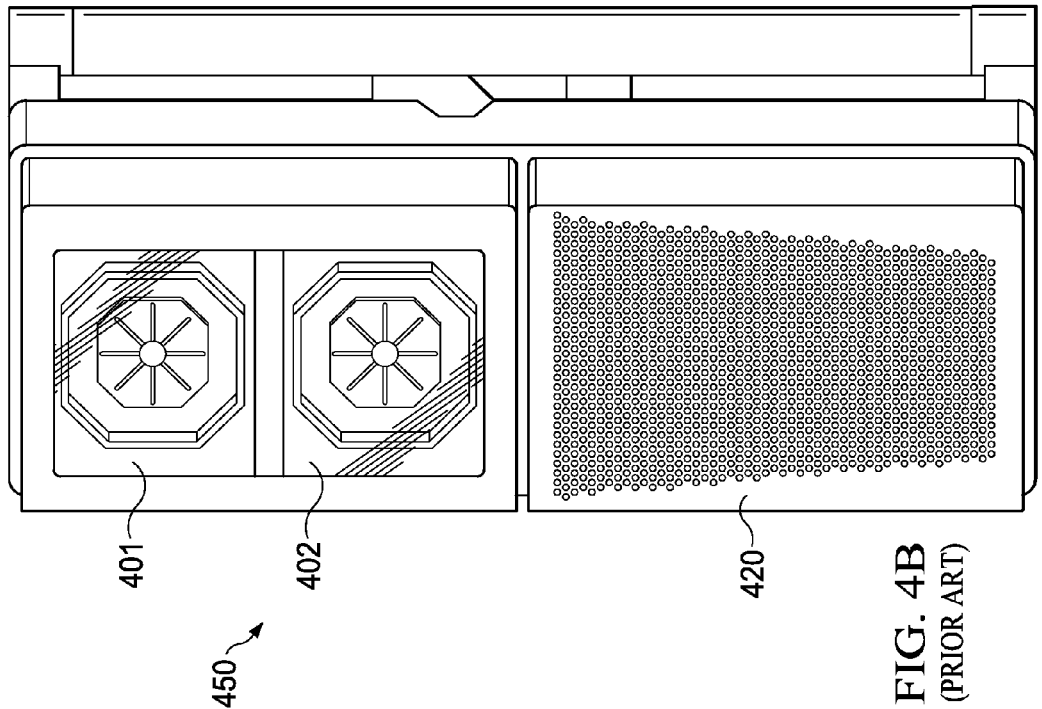
FIG. 4B illustrates conventional modular AAS.
Figure 4A:
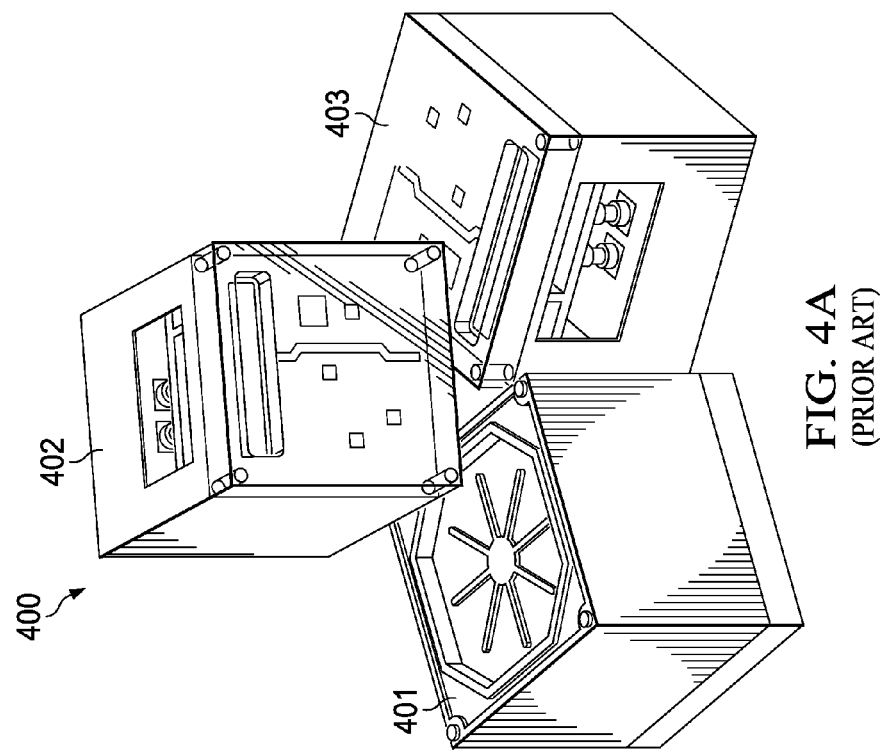
FIG. 4A illustrates a diagram of conventional RF modules.

Conventional RF modules in modular AASs may require the installation of external components (e.g., heat exchangers, etc.), and may also be dimensioned such that compact multi-sector AAS installation is not possible. FIG. 4A depicts a plurality of ALU lightradio cube RF modules 401-403 which have components (e.g., radiating elements, antenna reflector, power amplifiers, filters, transceivers, etc.) for achieving active antenna functionality. While the ALU lightradio cube RF modules 401-403 may themselves be somewhat compact, they may lack certain on-board functionality (e.g., thermal dissipation, etc.), and may consequently require external components, e.g., heat exchangers, power supply, etc. For instance, installation of the ALU lightradio cube RF modules 401-402 may require an auxiliary module 420 which includes an external heat exchanger as well as other auxiliary components), as shown in FIG. 4B. Inclusion of the auxiliary module 420 may increase the footprint of the modular AAS 440. Further, the ALU lightradio cube RF modules 401-402 are not designed for compact multi-sector antenna implementation.

Figure 5A:
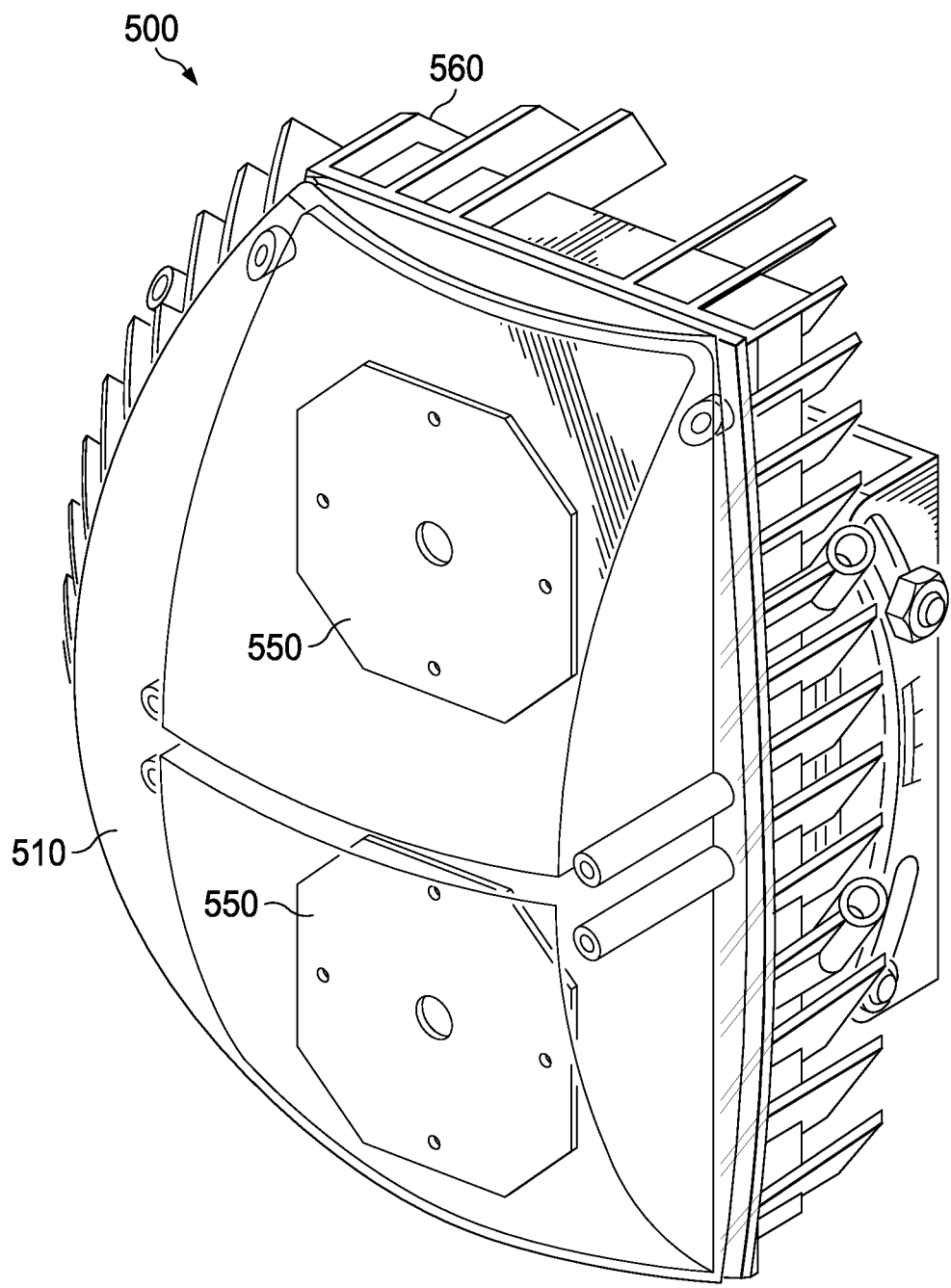
FIGS. 5A-5C illustrate diagrams of an embodiment RF module
Figure 5B:
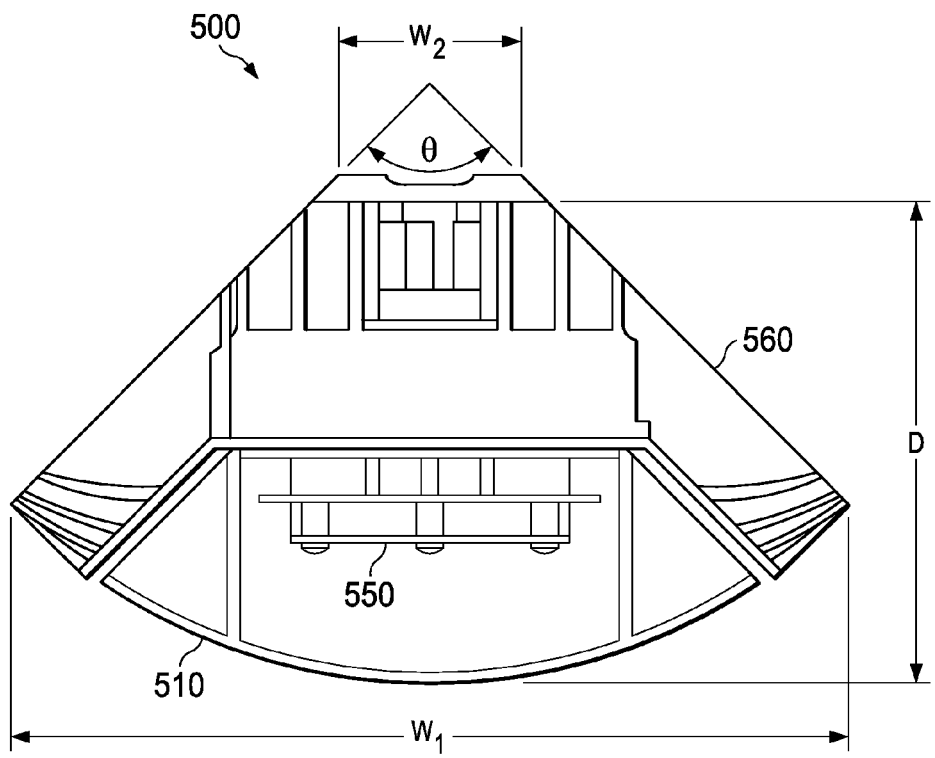
Figure 5C:
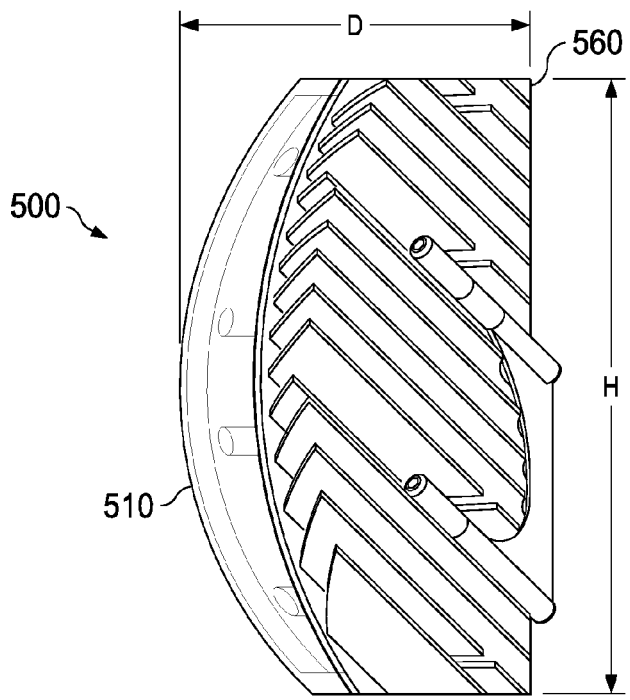

Aspects of this disclosure provide RF modules that are dimensioned for a multi-sector antenna implementation. FIGS. 5A-5C illustrate an RF module 500 designed for implementation in a multi-sector antenna. As shown in FIG. 5A, the RF module 500 includes a radome 510 that affixes to a frame 560 and encases a plurality of radiating elements 550. As shown in FIG. 5B, the RF module 500 is dimensioned such that the width of the radiating face (w1) exceeds the width of the non-radiating face (w2), which causes the RF module 500 to have a wedge shaped profile. The inner angle (θ) of the RF module 500 may vary depending on the design of the multi-sector antenna. For instance, the inner angle (θ) of the RF module 500 may be about 90 degrees for a four-sector antenna, or about 120° for a three-sector antenna. Further, the depth (D) and height (H) of the RF module 500 may be selected to facilitate a compact multi-sector antenna footprint, as can be seen in FIGS. 6A, 7A, 8A, and 9A.

Figure 6A:
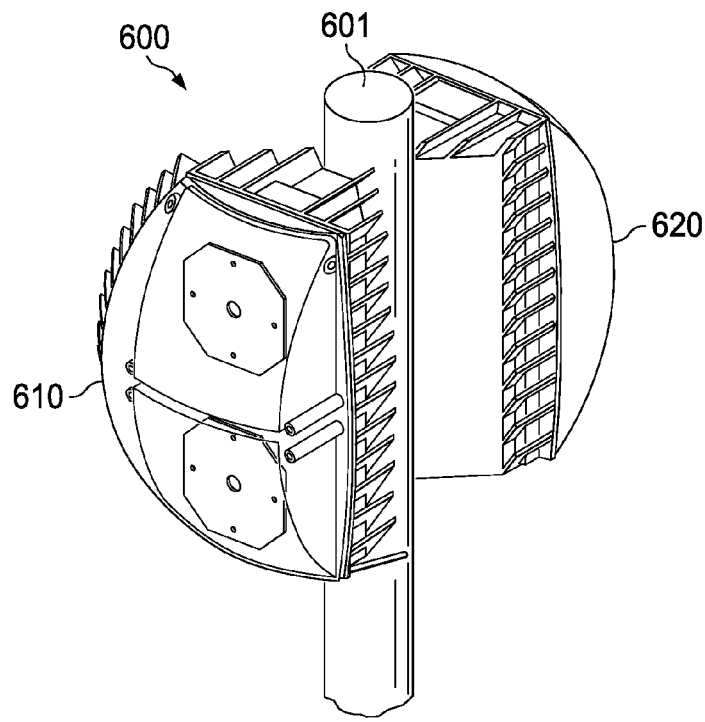
FIGS. 6A-6B illustrate diagrams of an embodiment multi-sector antenna.
Figure 6B:
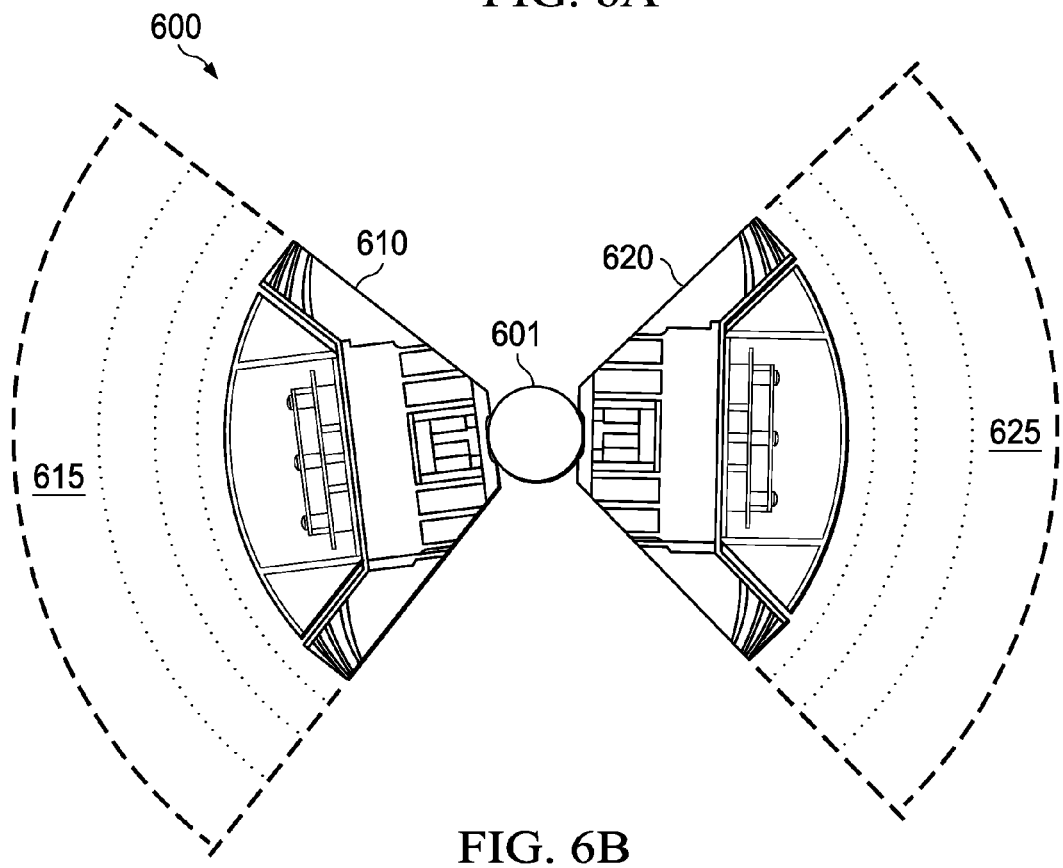
Figure 7A:
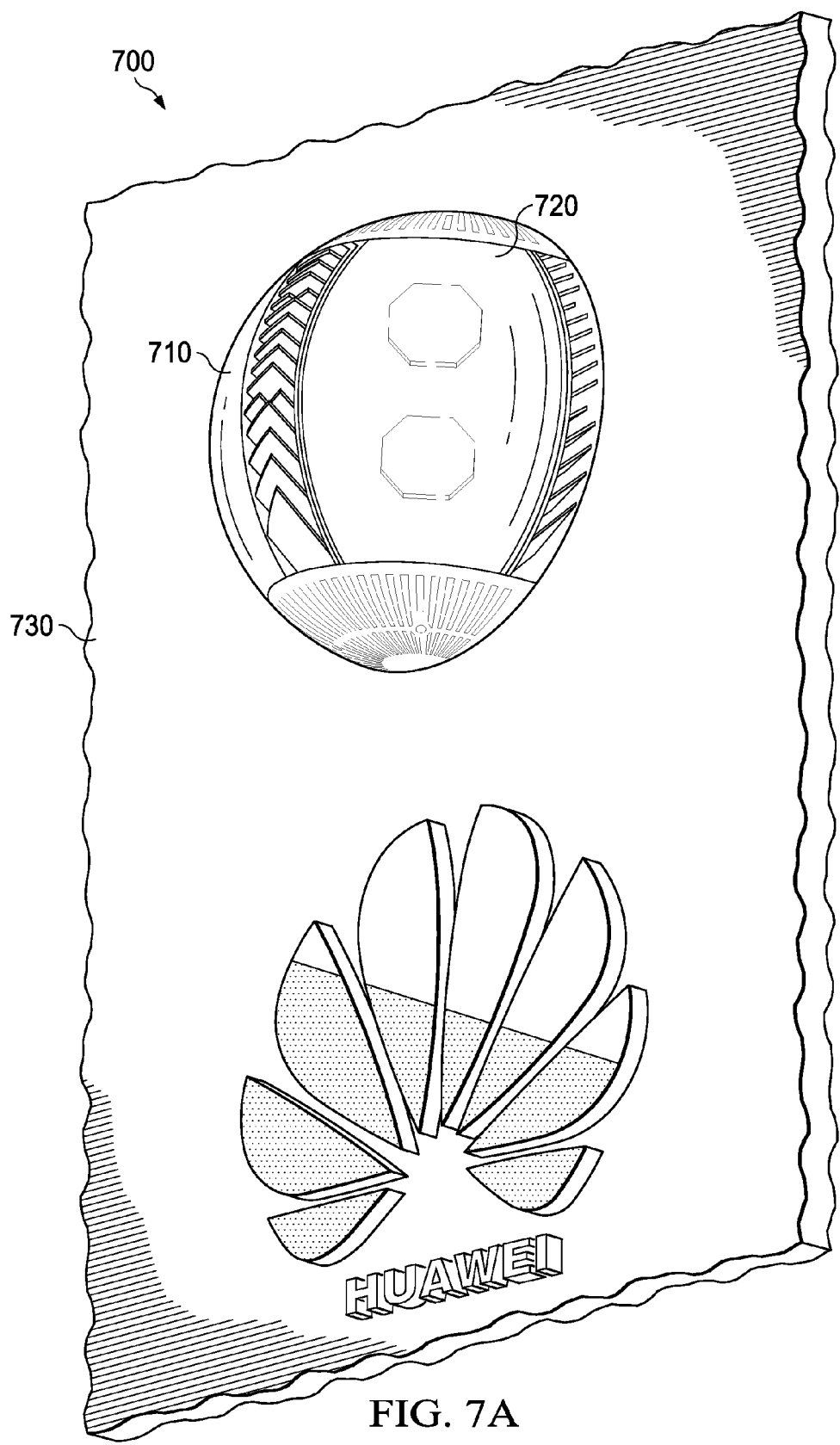
FIGS. 7A-7C illustrate diagrams of another embodiment multi-sector antenna.
Figure 7B:
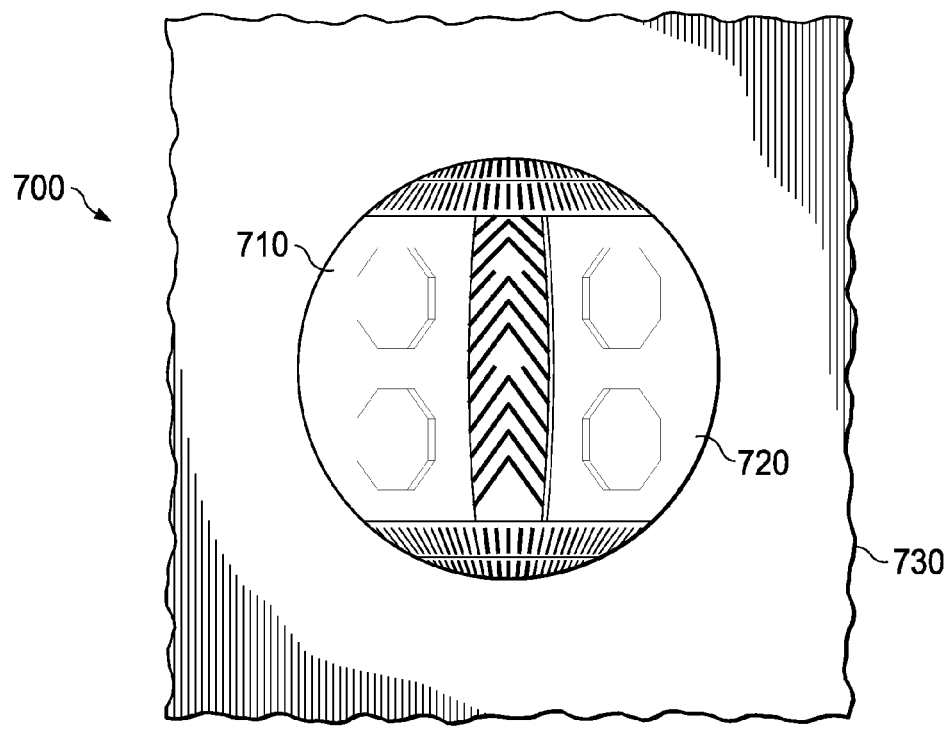
Figure 7C:
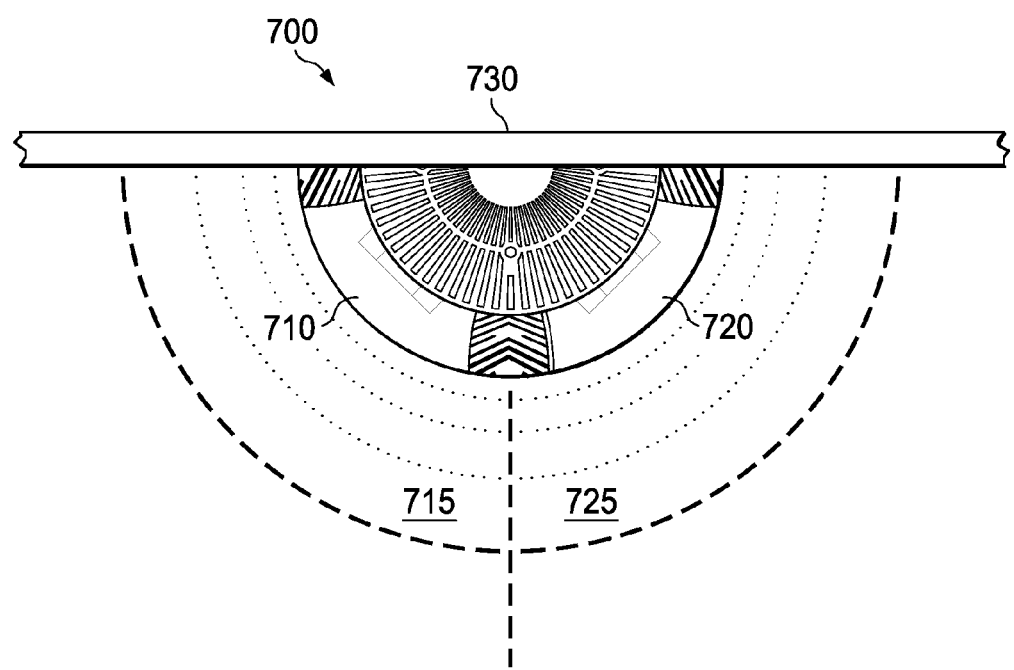

Aspects of this disclosure provide RF modules implemented in a multi-sector antenna implementation. FIG. 6A-6B illustrates a multi-sector antenna 600 comprising two RF modules 610-620 mounted on a backplane 601. As shown in FIG. 6B, the RF module 610 provides wireless access in a sector 615, while the RF module 620 provides wireless access in a sector 625. The multi-sector antenna 600 displayed in FIGS. 6A-6B represents one example of multi-sector antennas can be arranged. FIGS. 7A-7C illustrate another example of a multi-sector antenna 700. As shown in FIGS. 7A-7B, the multi-sector RF antenna 700 comprises two RF modules 710, 720 mounted on a wall 730. As shown in FIG. 7C, the RF module 710 provides wireless access in a sector 715, while the RF module 720 provides wireless access in a sector 725.

Figure 8B:
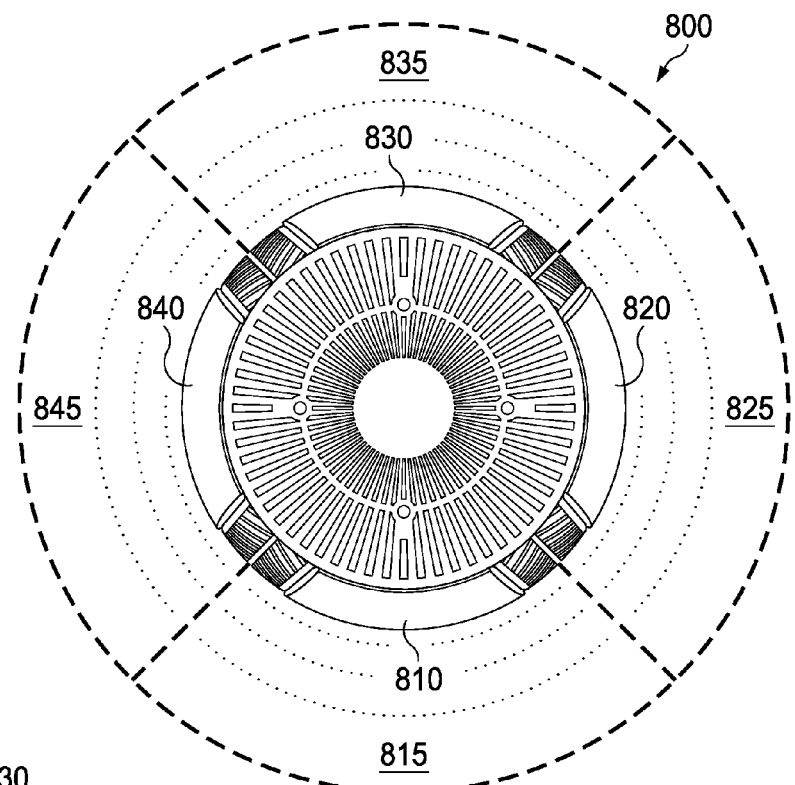
FIGS. 8A-8C illustrate diagrams of yet another embodiment multi-sector antenna.
Figure 8A:
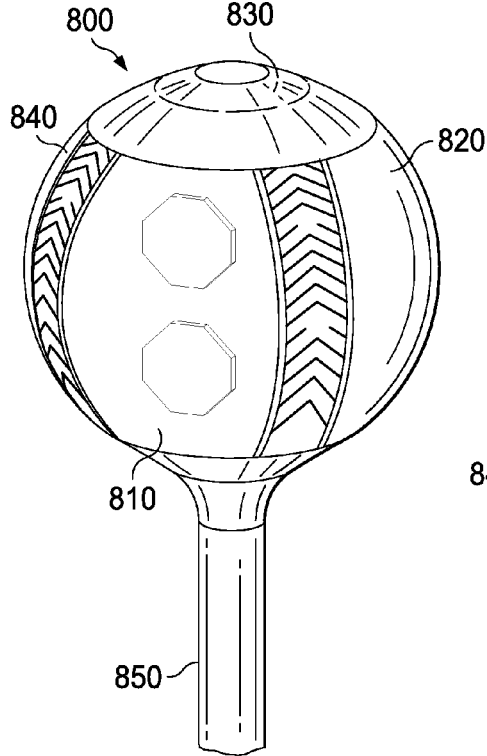
Figure 8C:
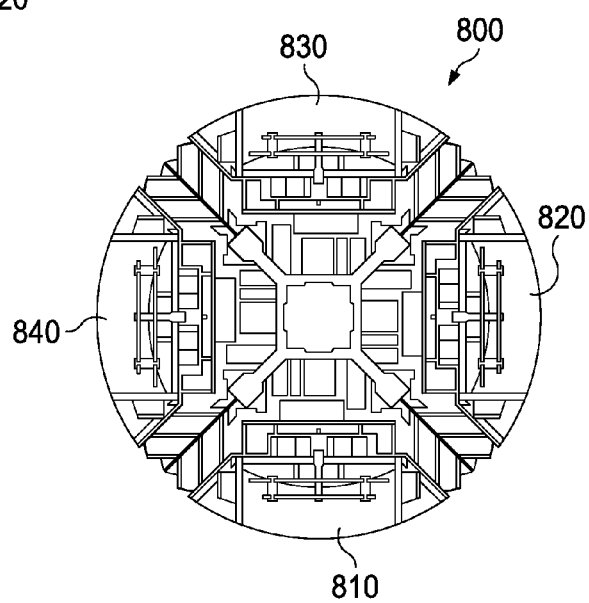

Multi-sector antennas can include more than two sectors. For instance, a multi-sector antenna may include four sectors. FIGS. 8A-8C illustrate a multi-sector antenna 800 comprising four RF modules 810, 820, 830, 840 mounted on a backplane 850. As shown in FIG. 8B, the RF module 810 provides wireless access in a sector 815, RF module 820 provides wireless access in a sector 825, RF module 830 provides wireless access in a sector 835, and the RF module 840 provides wireless access in a sector 845. As shown in FIG. 8C, the RF modules' 810, 820, 830, 840 wedged shape allow them to be configured in such a way that reduces the footprint of the multi-sector antenna 800, and allows for compact installation.

Figure 9B:
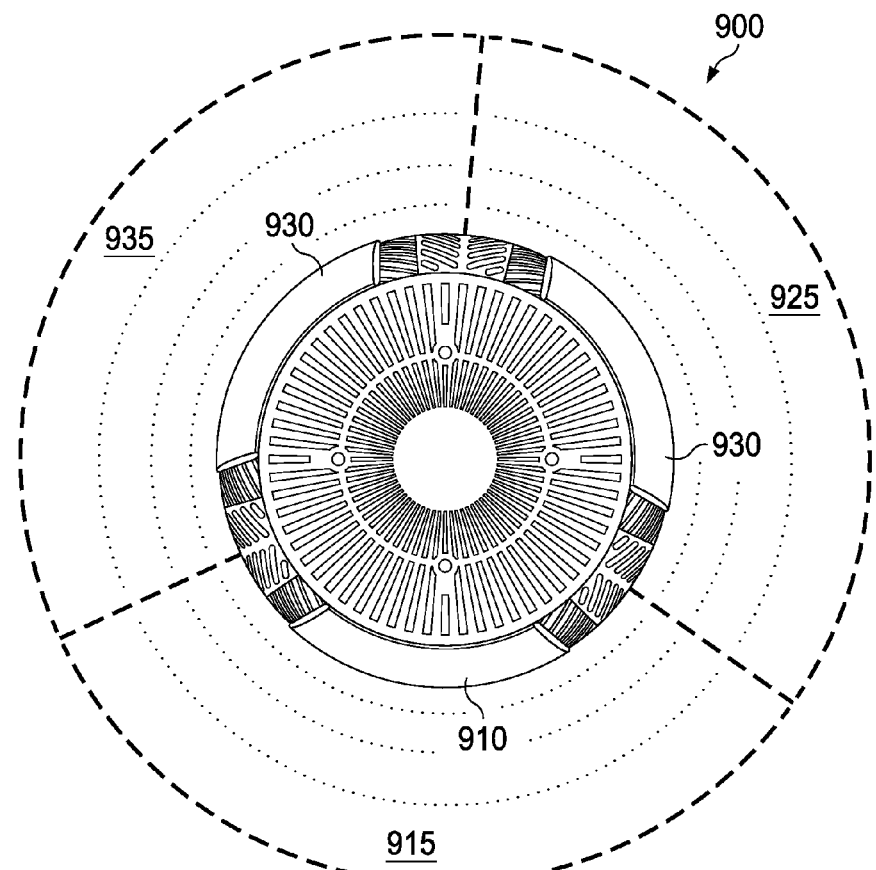
FIGS. 9A-9E illustrate diagrams of yet another embodiment multi-sector antenna.
Figure 9A:
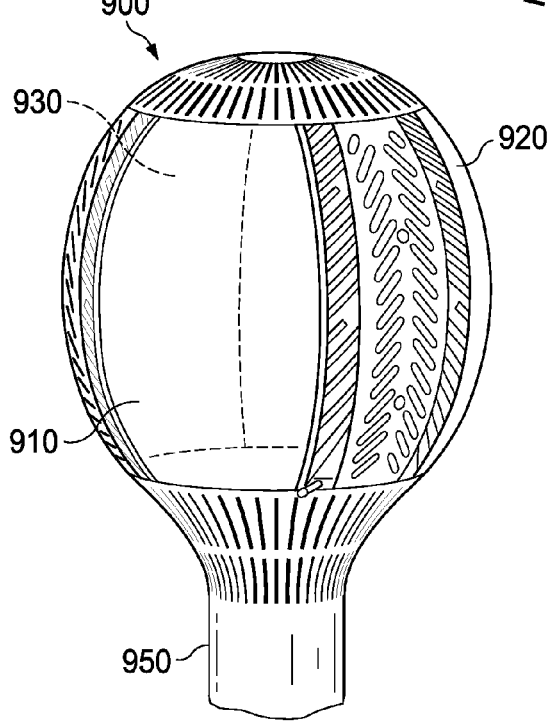
Figure 9C:
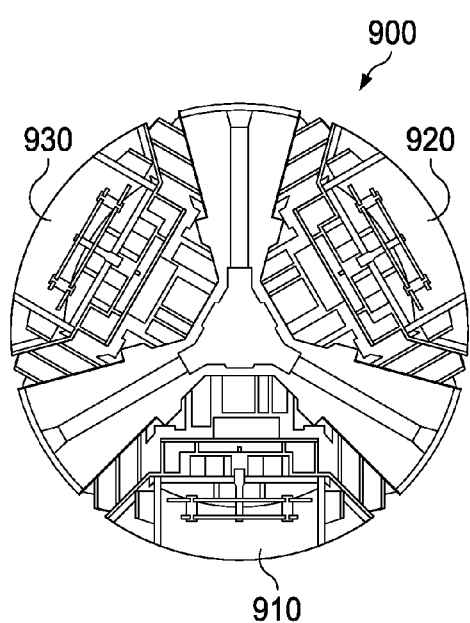
Figure 9D:
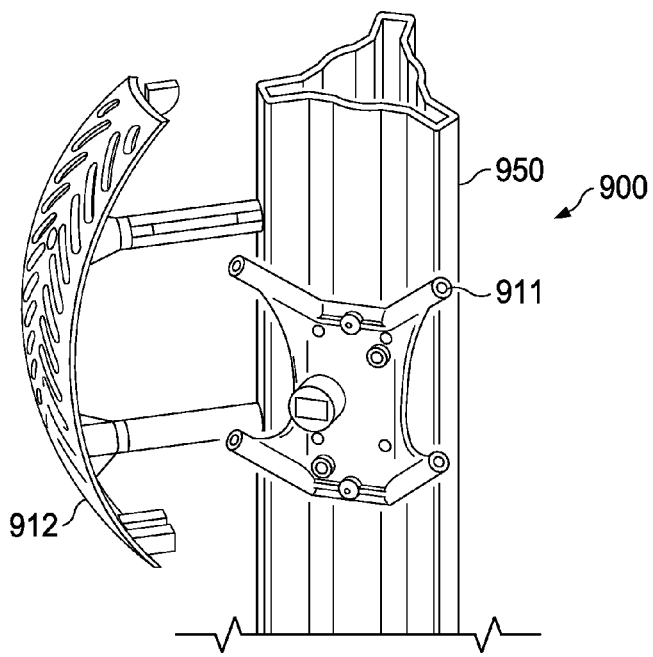
Figure 9E:
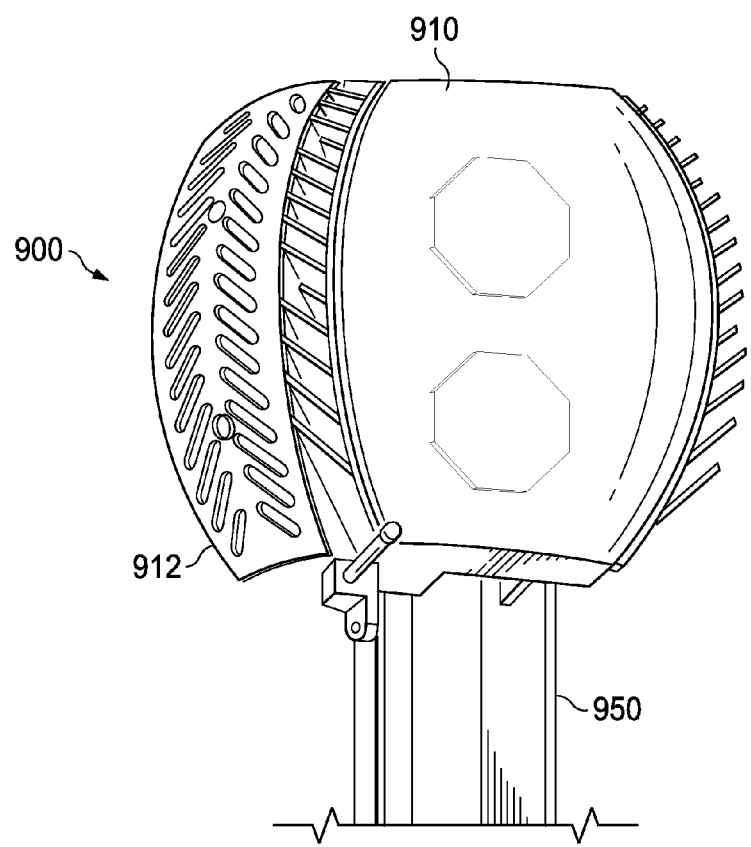
Figure 10A:
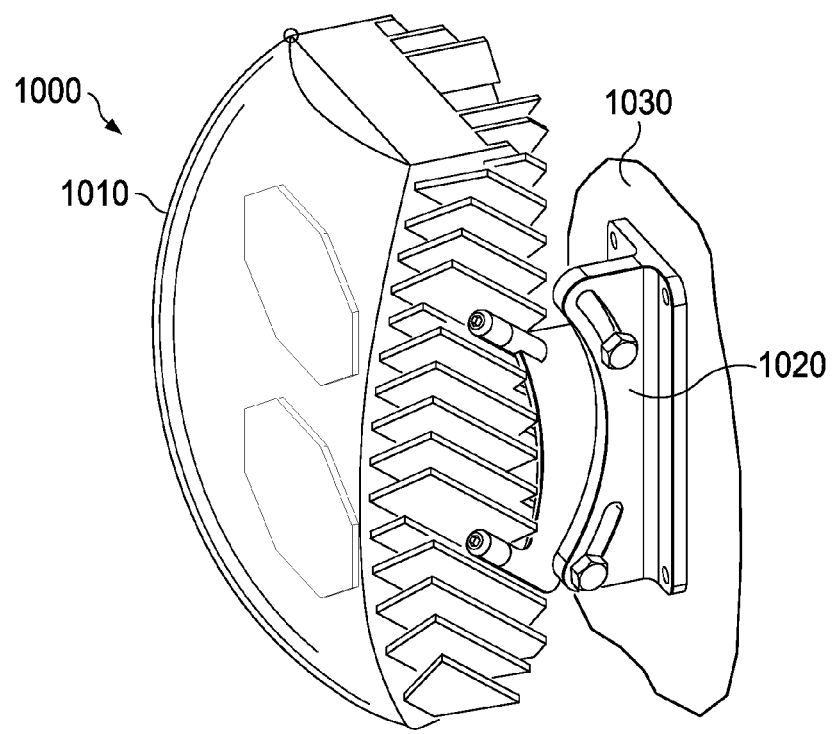
FIGS. 10A-10B illustrate diagrams of an embodiment single-sector antenna.
Figure 10B:
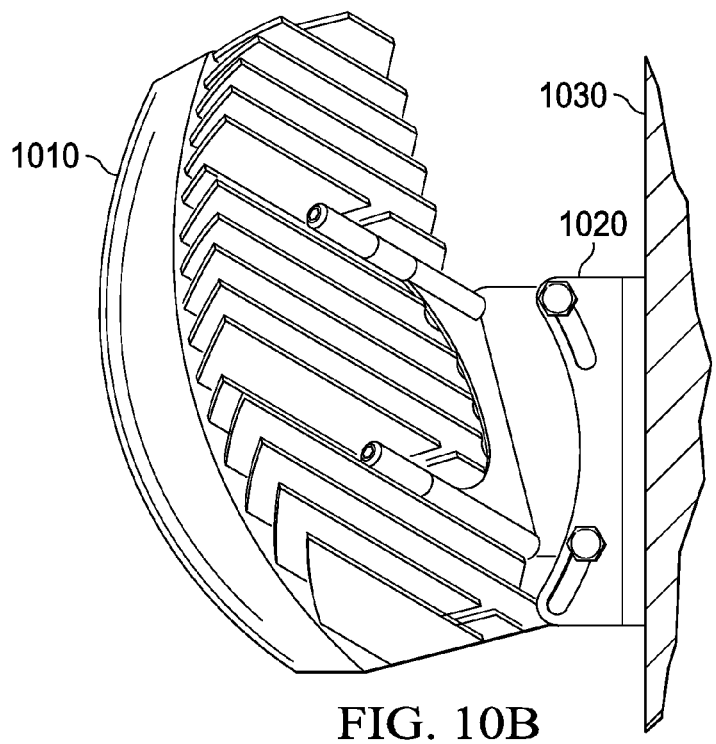

Additionally, a multi-sector antenna may include three sectors. FIGS. 9A-9D illustrate a multi-sector antenna 900 comprising three RF modules 910, 920, 930 mounted on a backplane 950. As shown in FIG. 9B, the RF module 910 provides wireless access in a sector 915, RF module 920 provides wireless access in a sector 925, and the RF module 930 provides wireless access in a sector 935. As shown in FIG. 9C, the RF modules' 910, 920, 930 wedged shape allow for compact installation of the multi-sector antenna 900. FIG. 9C illustrates how the mount 911 and the vent 912 mount to the backplane 950, while FIG. 9D illustrates how the RF module 910 is attached to the backplane 950. The RF modules disclosed herein may be mounted alone in a single sector configuration. FIGS. 10A-10B illustrate a single sector antenna 1000 comprising a lone RF module. As show, the RF module is mounted to a wall/backplane 1030 via a mount 1020.

As shown above, RF modules can be clustered together to provide multi-sector antenna functionality. Additionally, clusters of RF modules can be arranged in arrayed configuration, which may provide enhanced beamforming capability.

Figure 11:
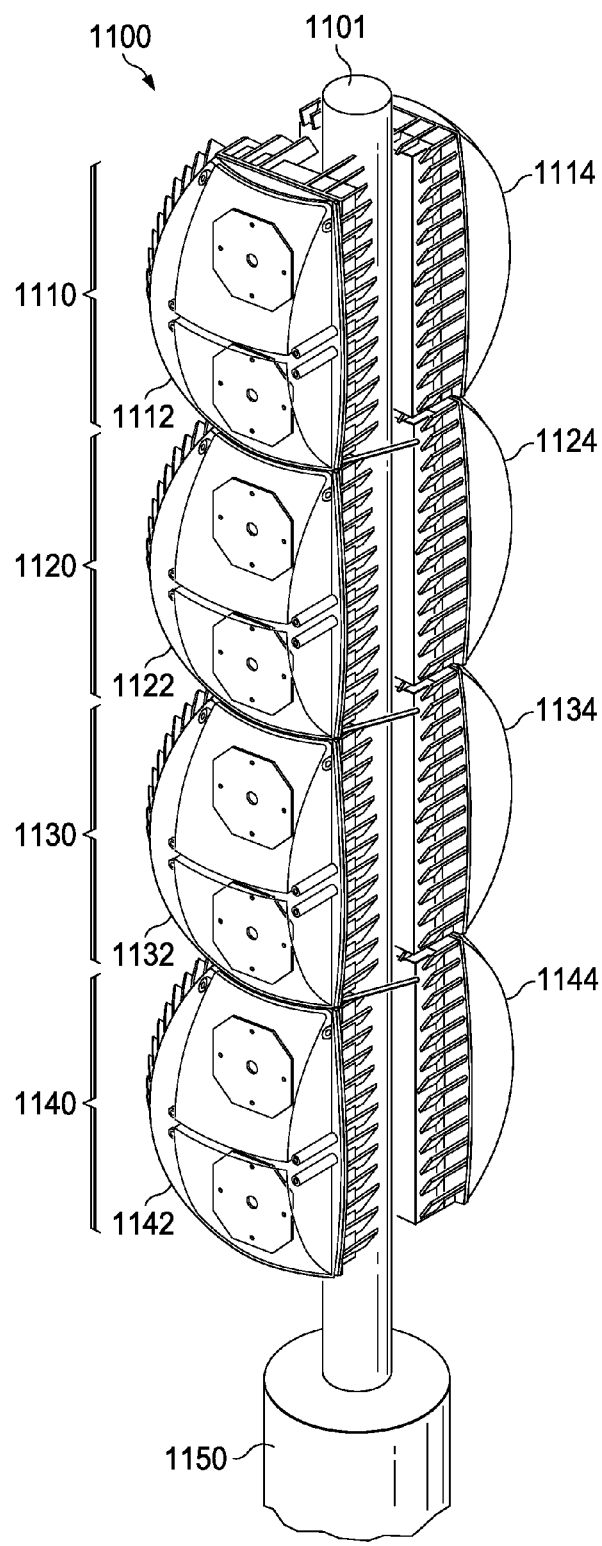
FIG. 11 illustrates a diagram of yet another embodiment multi-sector antenna.

FIG. 11 illustrates a multi-sector arrayed antenna 1100 configured to provide wireless coverage in two sectors. As shown, the multi-sector arrayed antenna 1100 includes a plurality of RF module clusters 1110, 1120, 1130, 1140 affixed to a backplane 1101. Each of the RF module clusters 1110, 1120, 1130, 1140 include two RF modules. More specifically, the RF module cluster 1110 includes the RF modules 1112-1114, the RF module cluster 1120 includes the RF modules 1122-1124, the RF module cluster 1130 includes the RF modules 1132-1134, and the RF module cluster 1140 includes the RF modules 1142-1144. Additionally, the multi-sector arrayed antenna 1100 may include a common module 1150 affixed to the backplane 1101. The common module may provide baseband processing functionality for the RF clusters 1110, 1120, 1130, 1140.

Figure 12:
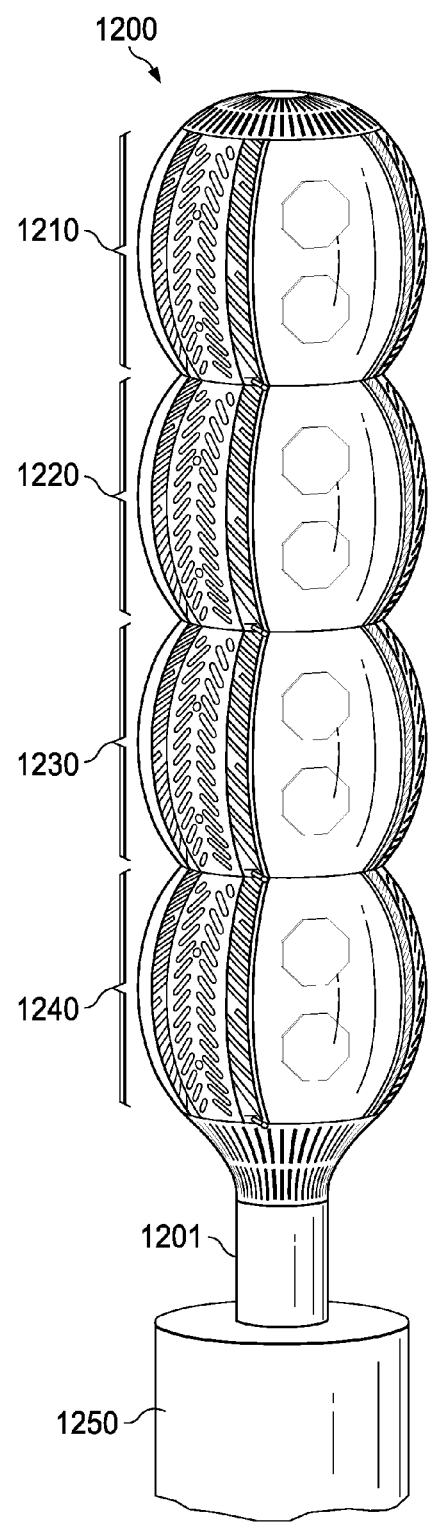
FIG. 12 illustrates a diagram of yet another embodiment multi-sector antenna.

FIG. 12 illustrates another embodiment multi-sector arrayed antenna 1200 configured to provide wireless coverage in three sectors. As shown, the multi-sector arrayed antenna 1200 comprises a plurality of RF module clusters 1210, 1220, 1230, 1240 and a common module 1250 affixed to a backplane 1201.

Figure 13:
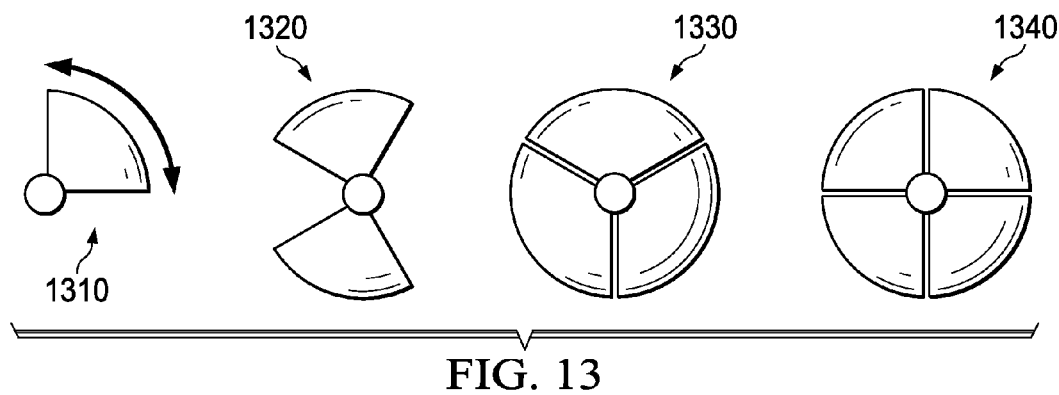
FIG. 13 illustrates diagrams of antenna configurations.
Figure 14:
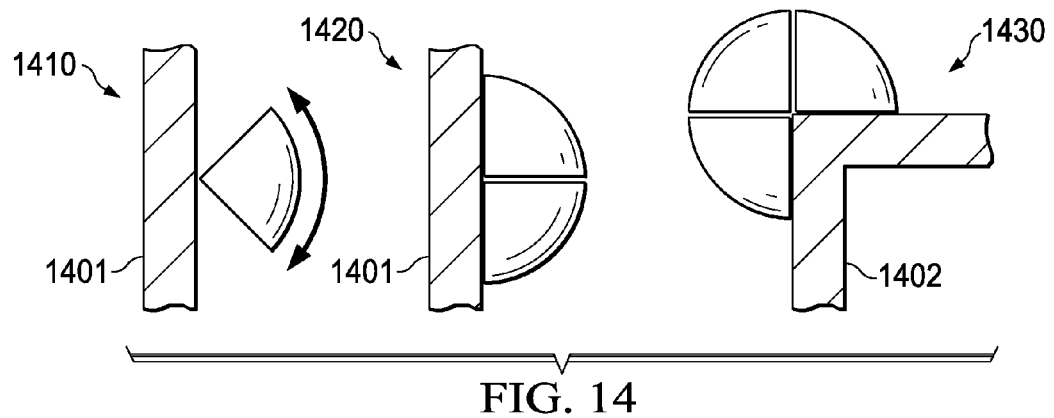
FIG. 14 illustrates diagrams of additional antenna configurations.
Figure 15:
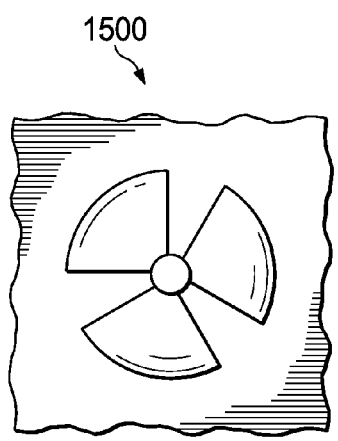
FIG. 15 illustrates a diagram of yet another antenna configuration.
Figure 16:
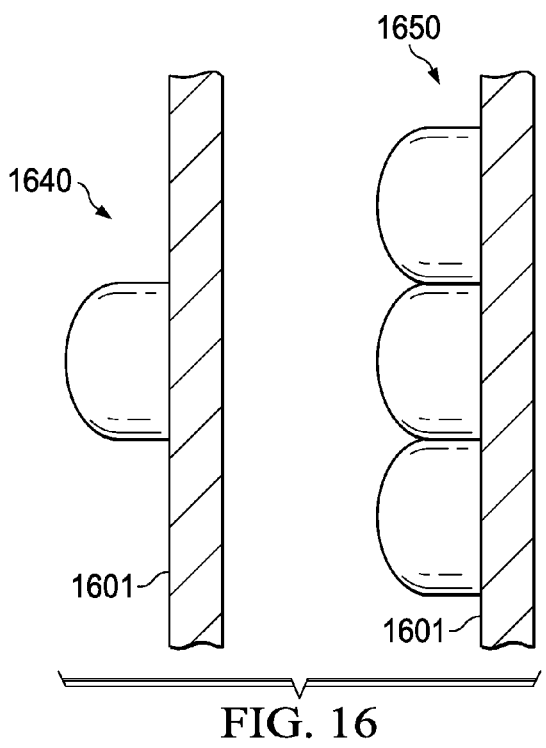
FIG. 16 illustrates diagrams of yet additional antenna configurations.

Embodiment RF modules may be arranged on a backplane to provide sectorized wireless coverage. FIG. 13 illustrates birds-eye views of a single sector configuration 1310, a dual-sector configuration 1320, a tri-sector configuration 1330, and a quad-sector configuration 1340. Embodiment RF modules may also be arranged on a wall to provide sectorized wireless coverage. FIG. 14 illustrates a single sector configuration 1410 and a dual-sector configuration 1420 mounted on a wall 1401, as well as a tri-sector configuration 1430 mounted on a corner 1402. In one embodiment, the configurations 1410-1420 are depicted from a birds-eye view, such that horizontal sectorization is achieved. In another embodiment, the configurations 1410-1420 are depicted from a side view, such that vertical sectorization is achieved. Likewise, one embodiment depicts the tri-sector configuration 1430 on a corner adjoining two walls to achieve horizontal sectorization, while another embodiment depicts the tri-sector configuration 1430 on a corner adjoining a wall and a ceiling to achieve a hybrid vertical-horizontal sectorization. RF modules may also be affixed to a roof or ceiling, as demonstrated by the configuration 1500 in FIG. 15. Further, RF module clusters may be arranged in a single configuration 1640 or an arrayed configuration 1650, as depicted in FIG. 16.

An embodiment provides a multi-sector AAS based on modular components. An embodiment scalable multi-sector AAS has individually-serviceable and replaceable modules in a small footprint for wireless access network applications. An embodiment modular AAS combines multiple modules to form an antenna array to provide coverage and capacity for an area. An embodiment provides a multi-sector base station in a small form factor built from multiple arrays constructed from the modules.

An embodiment multiple sector AAS is integrated into a single physical entity to provide high performance and high capacity wireless access. In an embodiment, the electronics of the base station are integrated with the antennas and configured in an enclosure such that a single installation provisions multiple sectors.

A small number of modules can be arrayed together to provide higher gain and larger coverage. Beam forming capability can support beam tilting and panning, and sectorization.

Figure 17A:
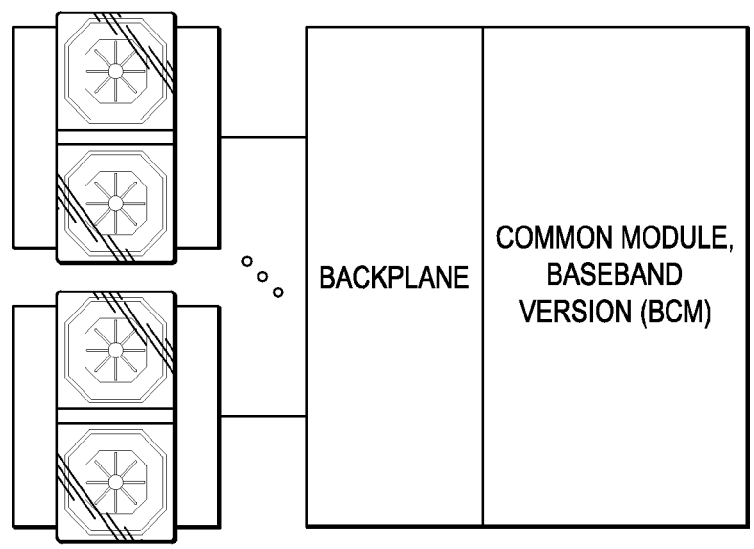
FIG. 17A illustrates a diagram of an embodiment baseband common module.
Figure 17B:
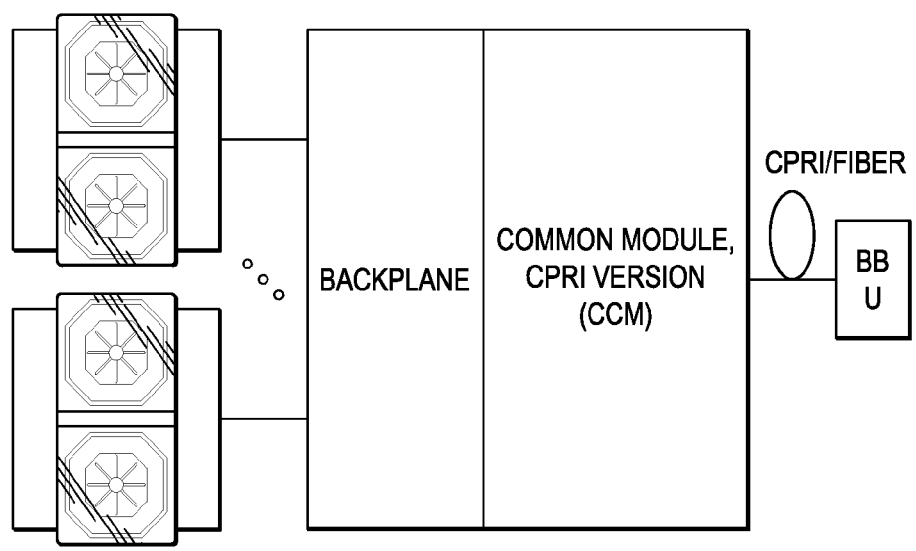
FIG. 17B illustrates a diagram of an embodiment common public radio interface module.

FIG. 17A illustrates a baseband common module embodiment. FIG. 17B illustrates a common public radio interface (CPRI) common module embodiment.

In various embodiments, the AAS also includes one or more common modules that contain one or more of beam-forming, calibration, baseband processing, and network interface functionality. In various embodiments, the AAS includes a mounting apparatus that optionally has fixed near-field RF probes mounted on it, and an associated passive distribution network coupling the probes to a common module.

An embodiment apparatus is field serviceable and can continue to handle traffic even if an RF module needs to be replaced. An embodiment provides a small footprint and is easy to install. An embodiment has a scalable architecture based on individually-serviceable and/or replaceable active modules. An embodiment small form factor multi-sector base station can be readily configured for customer coverage and/or capacity requirements. An embodiment is scalable through the addition of more modules.

An embodiment provides optimization enhancements by electronically changing the antenna down-tilt or antenna beam configuration. An embodiment provides flexible multi-sector macro cell installation. An embodiment uses a modular design approach that integrates active electronics with the antennas. An embodiment is easier to install and has self-contained functionality. An embodiment minimizes the footprint of a multi-sector cell configuration and adapts to multiple deployment scenarios. An embodiment provides AAS products that are modular, easier to service and have a lower cost. Embodiments may be applied to a mobile broadband infrastructure, such as multi-sector base stations.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A multi-sector antenna comprising:
a cluster of radio frequency (RF) modules configured for wireless communication, wherein at least some RF modules in the cluster of RF modules are configured to provide wireless coverage to different sectors in a plurality of sectors in a coverage area of the multi-sector antenna.

2. The multi-sector antenna of claim 1, wherein RF modules in the cluster of RF modules are mounted adjacently to one another such that a radiating face of each respective RF module faces outwardly and away from other RF modules in the cluster of RF modules.

3. The multi-sector antenna of claim 1, wherein each RF module in the cluster of RF modules is configured to provide wireless coverage to a different one of the plurality of sectors.

4. The multi-sector antenna of claim 3, wherein the multi-sector antenna is configured to provide 360 degrees of wireless coverage.

5. The multi-sector antenna of claim 4, wherein the cluster of RF modules includes three RF modules each of which providing wireless coverage to a different sector spanning about 120 degrees.

6. The multi-sector antenna of claim 4, wherein the cluster of RF modules includes four RF modules each of which providing wireless coverage to a different sector spanning about 90 degrees.

7. The multi-sector antenna of claim 3, wherein the multi-sector antenna is configured to provide 180 degrees of wireless coverage.

8. The multi-sector antenna of claim 7, wherein the cluster of RF modules includes two RF modules each of which providing wireless coverage to a different sector spanning about 90 degrees.

9. The multi-sector antenna of claim 1 further comprising: a common module coupled to each of the plurality of RF modules.

10. The multi-sector antenna of claim 9, wherein the common module is configured to provide baseband processing for the multi-sector antenna.

11. The multi-sector antenna of claim 9, wherein the common module is configured to provide beam-forming functionality for the multi-sector antenna.

12. An active antenna system (AAS) for providing wireless access to a plurality of sectors, the AAS comprising:
    a backplane structure; and
    a plurality of radio frequency (RF) modules affixed to the backplane structure,
    wherein at least one RF module in the plurality of RF modules is configured to provide wireless coverage to a different one of the plurality of sectors than another RF module in the plurality of RF modules.

13. The AAS of claim 12, wherein the plurality of RF modules includes a first cluster of RF modules, wherein RF modules in the first cluster of RF modules are mounted adjacently to one another, and wherein a first RF module in the first cluster of RF modules is configured to serve a different one of the plurality of sectors than a second RF module in the first cluster of RF modules.

14. The AAS of claim 13, wherein the AAS is configured to provide 360 degrees of wireless coverage.

15. The AAS of claim 14, wherein the first cluster of RF modules includes three RF modules each of which providing wireless coverage to a different sector spanning about 120 degrees.

16. The AAS of claim 14, wherein the first cluster of RF modules includes four RF modules each of which providing wireless coverage to a different sector spanning about 90 degrees.

17. The AAS of claim 13, further comprising a common module configured to is configured to provide baseband processing for the AAS.

18. The AAS of claim 13, wherein the plurality of RF modules includes a second cluster of RF modules.

19. The AAS of claim 18, wherein the first cluster of RF modules and the second cluster of RF modules are arranged in arrayed configuration such that a first sector in the plurality of sectors is served by both an RF module in the first cluster of RF modules and an RF module in the second cluster of RF modules.

20. The AAS of claim 19, further comprising a common module coupled to RF modules in both the first cluster of RF modules and the second cluster of RF modules,
    wherein the common module is configured to select beamforming weight parameters for a beamforming transmission to a user equipment (UE) positioned in the first sector, and to communicate the beamforming weight parameters to the RF module in the first cluster of RF modules and the RF module in the second cluster of RF modules.

21. A method comprising:
    communicating, by an active antenna system (AAS), data with wireless devices positioned within a plurality of sectors in a multi-sector coverage area of the AAS, wherein the AAS includes a plurality of radio frequency (RF) modules, and wherein at least one RF module in the plurality of RF modules is configured to serve a different one of the plurality of sectors than another RF module in the plurality of RF modules.

22. The method of claim 21, wherein communicating data with wireless devices positioned within the plurality of sectors of the multi-sector coverage area comprises:
    communicating, by a first RF module, data with a first group of one or more wireless devices positioned within a first sector in the plurality of sectors of the multi-sector coverage area; and
    communicating, by a second RF module, data with a second group of one or more wireless devices positioned within a second sector in the plurality of sectors of the multi-sector coverage area.

23. The method of claim 22, wherein the first sector and the second sector are different sectors within the multi-sector coverage area.

24. The method of claim 22, wherein the first group of one or more wireless devices exclude wireless devices located outside of the first sector, and wherein the second group of one or more wireless devices exclude wireless devices located outside of the second sector.

25. The method of claim 21, wherein the first RF module is mounted adjacently to the second RF module, and wherein a radiating face of the first RF module faces in a different direction than a radiating face of the second RF module.

* * * * *